(12) United States Patent
Mason

(10) Patent No.: US 10,661,599 B2
(45) Date of Patent: May 26, 2020

(54) LOOSE WHEEL NUT INDICATOR

(71) Applicant: MARCHMONT PTY LIMITED, Redlynch (QLD) (AU)

(72) Inventor: Ronald Robert Mason, Redlynch (AU)

( * ) Notice: Subject to any disclaimer, the term of this patent is extended or adjusted under 35 U.S.C. 154(b) by 0 days.

(21) Appl. No.: 14/901,637

(22) PCT Filed: Apr. 4, 2014

(86) PCT No.: PCT/AU2014/000363
§ 371 (c)(1),
(2) Date: Dec. 28, 2015

(87) PCT Pub. No.: WO2015/000013
PCT Pub. Date: Jan. 8, 2015

(65) Prior Publication Data
US 2016/0214430 A1 Jul. 28, 2016

(30) Foreign Application Priority Data

May 7, 2013 (AU) ................................ 2013902494
Aug. 14, 2013 (AU) ................................ 2013903053

(51) Int. Cl.
*B60B 3/16* (2006.01)
*F16B 39/10* (2006.01)
(Continued)

(52) U.S. Cl.
CPC ................ *B60B 3/16* (2013.01); *B60B 3/165* (2013.01); *F16B 1/0071* (2013.01); *F16B 37/14* (2013.01);
(Continued)

(58) Field of Classification Search
CPC ....... F16B 1/0071; F16B 39/101; B60B 3/165
(Continued)

(56) References Cited

U.S. PATENT DOCUMENTS 4,657,457 A    4/1987 Richwood
5,624,218 A *  4/1997 Dauwalter ............ F16B 39/101
                                                411/373
(Continued)

FOREIGN PATENT DOCUMENTS

EP    1420176 B1    5/2004
GB    2406365 B     3/2005

OTHER PUBLICATIONS

Australian Office Action dated Feb. 3, 2017, 4 pages.

*Primary Examiner* — Flemming Saether
(74) *Attorney, Agent, or Firm* — Abelman, Frayne & Schwab; Stefan Knirr

(57) ABSTRACT

Apparatus for visually indicating a loose wheel nut on a motor vehicle has a first ring for engaging a first wheel nut so as to be rotatable therewith and a second ring for engaging a second wheel nut adjacent to the first wheel nut so as to be rotatable therewith. The first ring has a first pointer for indicating a start position of the first ring, and the second ring has a second pointer for indicating a start position of the second ring. A resiliently flexible elongate member interconnects the first and second rings. The elongate member is configured to curve in at least two directions and has a first end portion connected to the first ring and an opposed second end portion connected to the second ring. In use, any loosening rotation of the first wheel nut will cause the first ring and is pointer to rotate therewith, thereby providing a visual indication of a loosening of the first wheel nut.

5 Claims, 8 Drawing Sheets

(51) Int. Cl.
*F16B 1/00* (2006.01)
*F16B 37/14* (2006.01)

(52) U.S. Cl.
CPC ...... *F16B 39/101* (2013.01); *B60B 2900/325* (2013.01); *B60B 2900/3312* (2013.01)

(58) Field of Classification Search
USPC .............................. 411/13, 14, 102, 92, 87
See application file for complete search history.

(56) References Cited

U.S. PATENT DOCUMENTS

| | | | | |
|---|---|---|---|---|
| 6,158,933 A * | 12/2000 | Nicholson | ............... | F16B 37/14 |
| | | | | 116/200 |
| 6,398,312 B1 * | 6/2002 | Marczynski | .......... | F16B 1/0071 |
| | | | | 116/212 |
| 8,333,537 B2 * | 12/2012 | Rogers | .................... | F16B 31/02 |
| | | | | 301/35.622 |
| 8,708,627 B2 * | 4/2014 | Davies | ................... | B60B 3/165 |
| | | | | 411/102 |
| 9,057,396 B2 * | 6/2015 | Prince | .................. | F16B 39/101 |
| 9,353,776 B2 * | 5/2016 | Marczynski | .......... | F16B 1/0071 |
| 2002/0031416 A1 * | 3/2002 | Illes | ..................... | F16B 1/0071 |
| | | | | 411/87 |
| 2004/0156693 A1 * | 8/2004 | Paakko | .................. | B25B 23/00 |
| | | | | 411/102 |

* cited by examiner

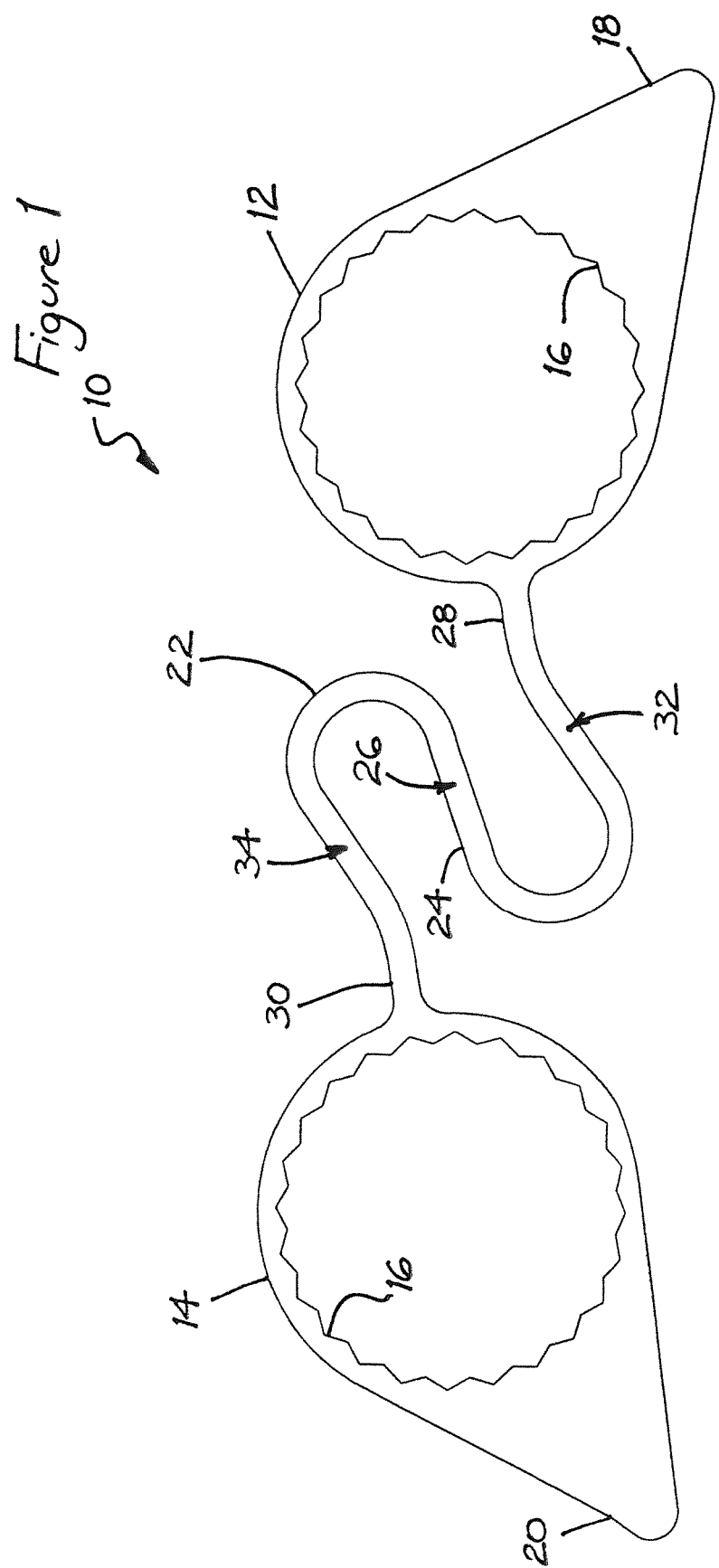

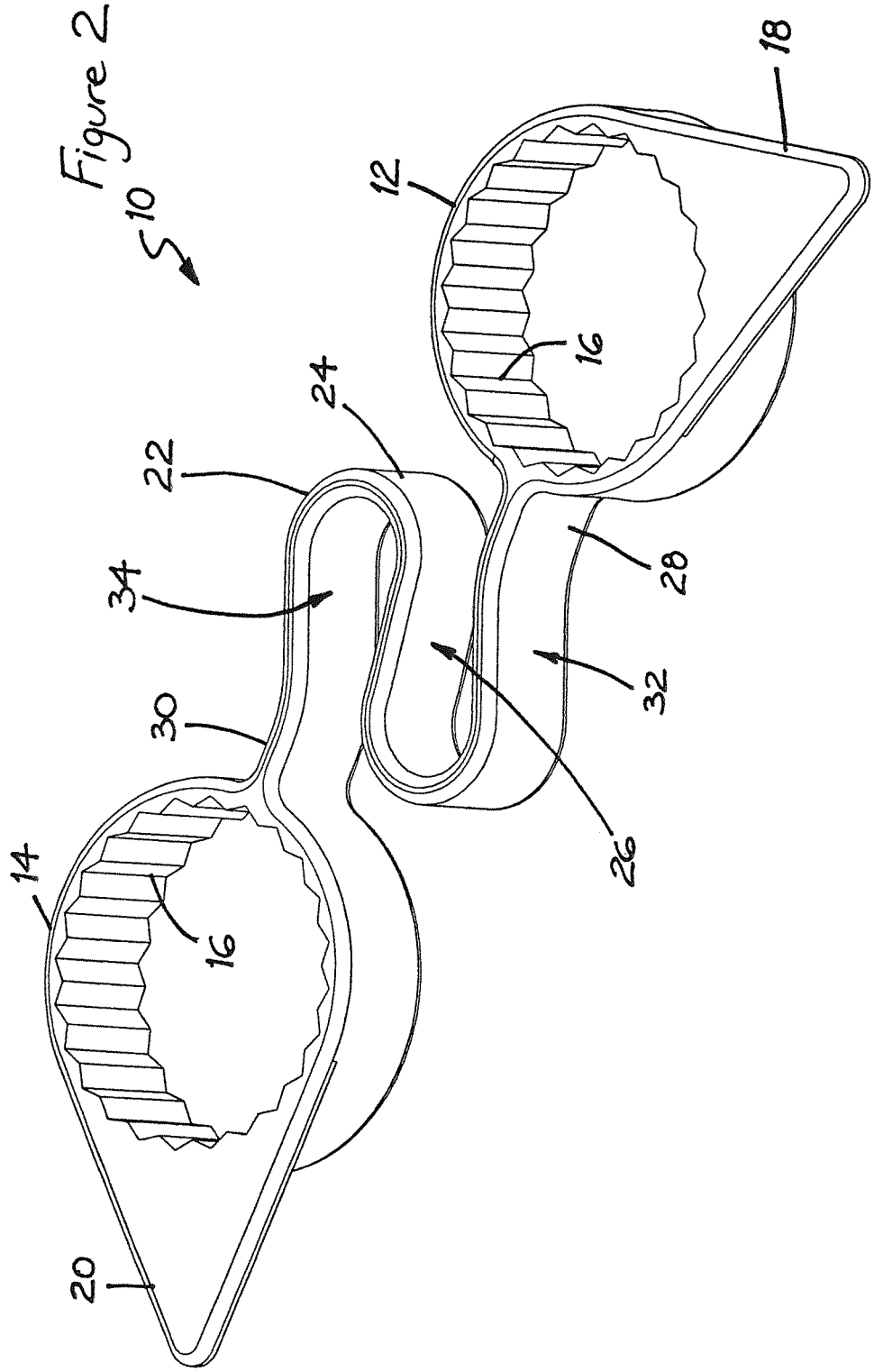

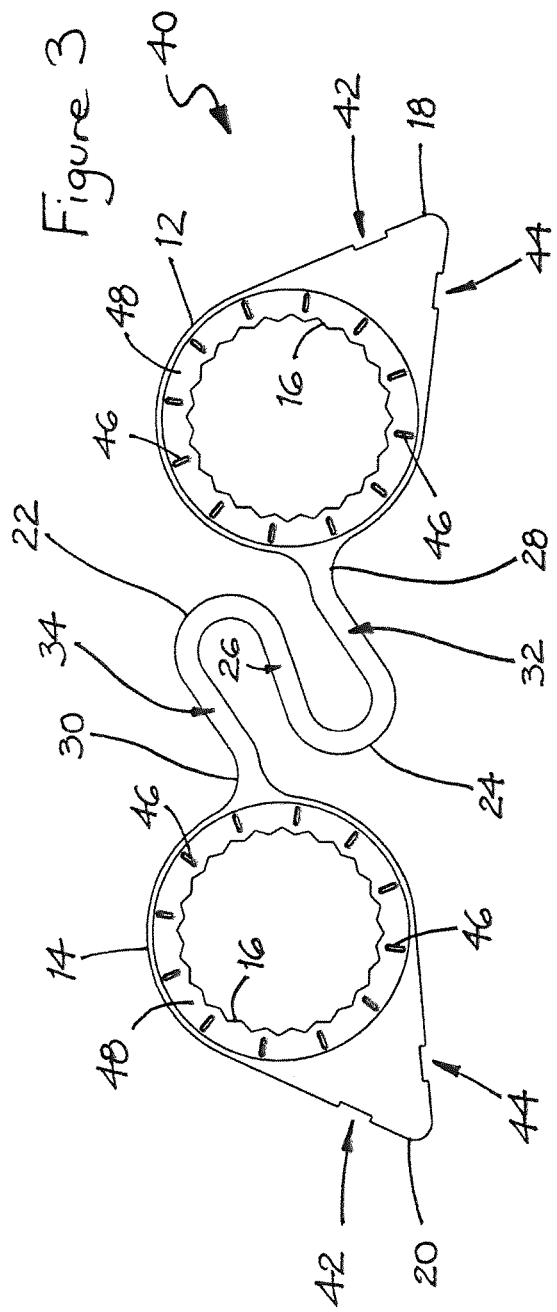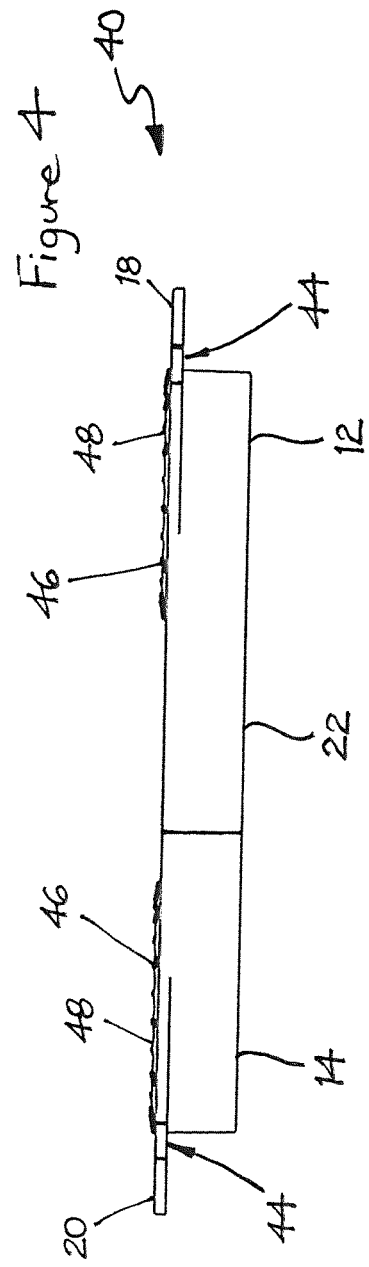

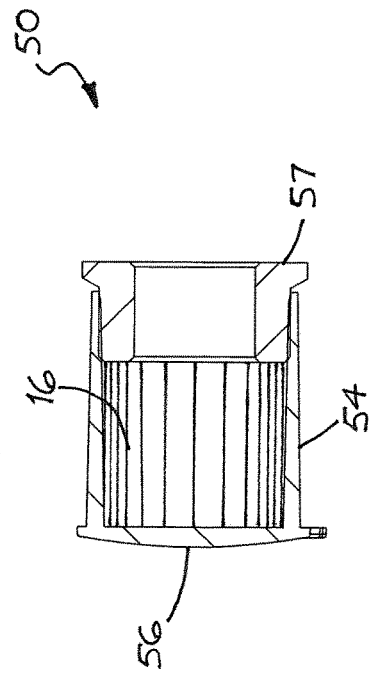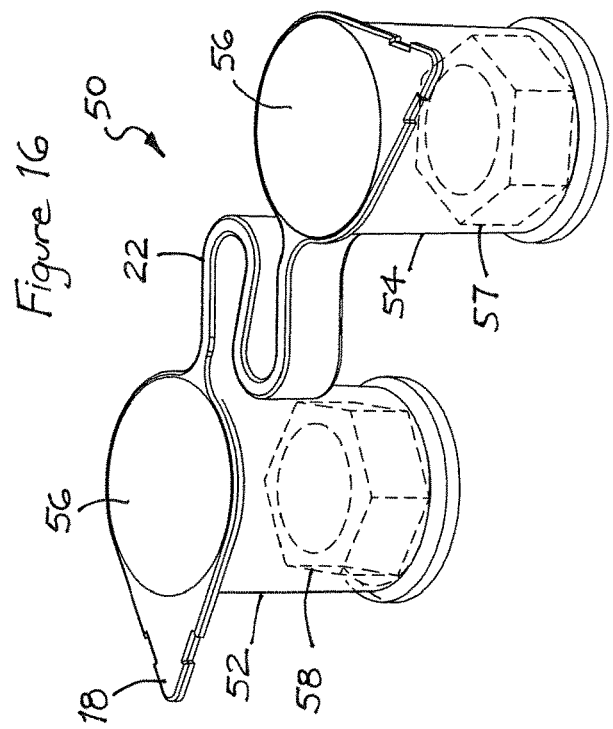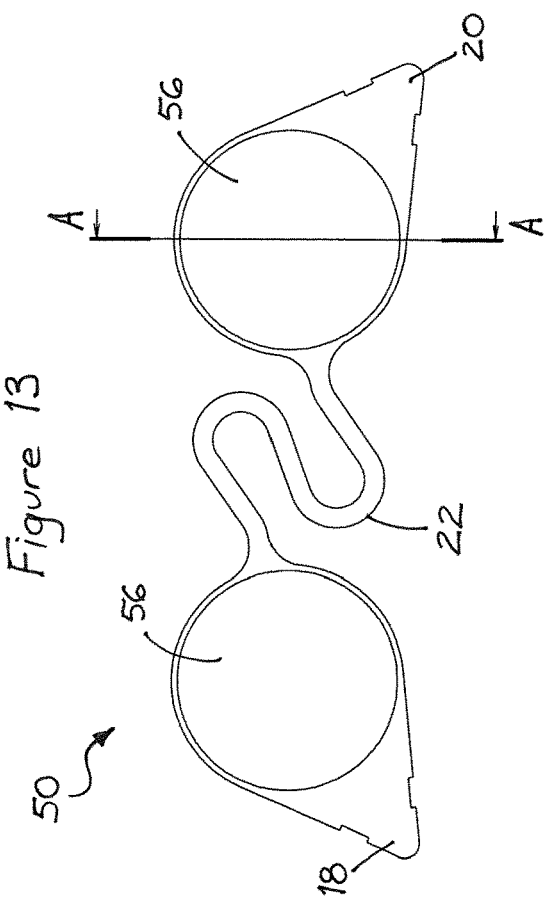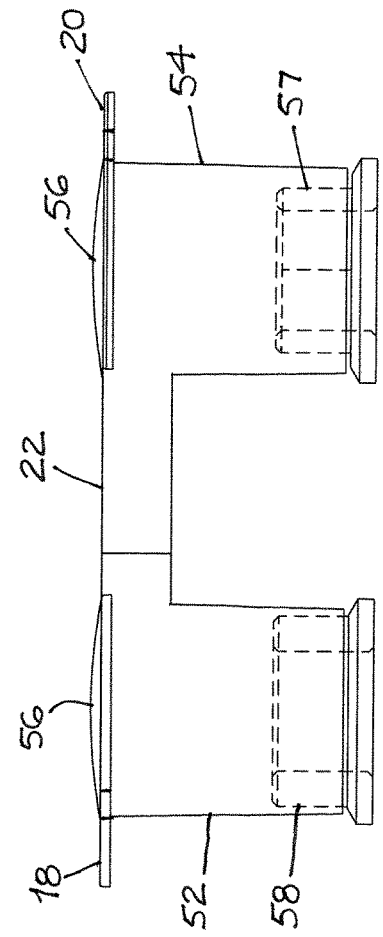

LOOSE WHEEL NUT INDICATOR

TECHNICAL FIELD

The present invention relates to a loose wheel nut indicator and, in particular, to an apparatus for visually indicating a loose wheel nut of a road motor vehicle. More particularly, the present invention relates to such an apparatus which may also be used to prevent any loosening of a wheel nut which is adjacent to the loose wheel nut, such that any further loosening of the loose wheel nut is restrained.

BACKGROUND ART

Road motor vehicles commonly have disc wheels which are held onto a hub of an axle by a plurality of wheel nuts, usually six, eight or ten in number, that are adapted to be threadably engaged to a corresponding number of studs equally spaced in a circle around the hub flange. The studs pass through holes in the wheel, and the wheel is secured to the hub by screwing the nuts tightly onto the studs to the correct torque.

However, the wheel nuts may loosen over time due to continuous or prolonged vibration of the vehicle and its front and rear axles. This problem may be particularly pronounced in heavy road motor vehicles and many other commercial road vehicles, which may have a larger number of axles, more than one wheel held onto each hub thereof, and very large and heavy wheels which make tightening of the nuts relatively difficult.

The tendency for wheel nuts to loosen over time in all road motor vehicles may be accelerated by a number of factors. These include a failure to initially tighten the nuts to the correct torque, the fitting of an incorrect wheel nut, the regular overtightening of the nuts with automated tools that cause stretching and fatigue of the studs, and the "settling" of the wheel on the hub that may occur after a wheel change which causes the force of the nut on the hub to be reduced.

Loosening of the wheel nuts can have serious adverse consequences. If a wheel nut becomes loose while the vehicle is in motion, the wheel may experience an increased radial load which, if unchecked, can cause severe damage to the wheel itself and/or to the stud, hub and possibly even the nut. In extreme cases, the wheel nut may unscrew from its stud or the wheel may sever the stud due to excessive bending loads, causing the wheel to detach from the hub with potentially disastrous results.

There have been many and varied attempts to address these problems, most of which have met with little or no success.

One approach has involved finding ways of preventing wheel nuts from becoming loose.

Apart from maintaining regular inspection and, if required, correction of wheel nut tighteners, well known self locking nut systems have been developed which rely on an interference fit between the thread on the stud and the thread on the nut to create a lock which stiffens the rotation of the nut, either by a portion of the nut thread being deformed and providing a resistance during the threaded engagement, or by locating a nylon or other deformable insert within the threaded bore of the nut and through which the stud cuts the thread against a stiffening resistance.

A problem with self locking nut systems is that they are designed to operate at maximum locking effectiveness for one tightening cycle only and, if used more than once, will have markedly reduced locking capability. Furthermore, the self locking nut cannot be tightened quickly by hand in the initial stage of its threaded engagement with the stud because the lock stiffens the rotation of the nut, with the result being that a spanner or other tool is required also at the initial stage, thereby considerably lengthening the time it takes to tighten the wheel nut and hence attach the wheel to the hub. These problems and shortcomings may be unacceptable to many users given that a wheel nut may have to be removed many times during the life of a vehicle. Replacement of worn out or damaged nuts would also become very expensive.

Another approach has involved finding ways to visually indicate in a timely manner when a wheel nut becomes loose so that appropriate intervention can occur to retighten or replace the nut before serious damage results.

It is known to provide loose wheel nut indicators in the form of one piece polymeric rings or caps which are firmly clipped around or over an individual wheel nut and which include a pointed or arrowhead portion to visually indicate any loosening of the wheel nut by its unwanted rotation.

A problem with loose wheel nut indicators of the type described above is that the arrowhead portion needs to be pointing in a predetermined start direction and any indication of wheel nut loosening must require the identification of deviation from that initial direction. In many cases, loosening of a wheel nut that may lead to problems could result from a rotation of greater than about 5°, but for rotations from about 5° to up to about 20°, identification of such deviation may be very difficult to visually detect or may be missed altogether with the use of such one piece, clip on, pointed indicators.

Furthermore, these indicators operate on individual wheel nuts, and so any loosening of one nut is independent of the behaviour of any of the other nuts. Therefore, each indicator does not have any means of preventing any other nut from loosening or of restraining any further loosening of the already loosened nut.

Australian Innovation Patent No. 2010 101 053, now ceased, discloses a loose wheel nut indicator in the form of a cap or cover having a body that can closely fit over a tightened nut so as to be rotatable with the nut, and which includes a dial or other means that is rotatable relative to the nut for visibly indicating any loosening of the nut. This indicator is complex in its construction, requiring both a body and a dial which are separately manufactured, together with a complex structure for their cooperation with the nut, and furthermore operates only on individual nuts.

DISCLOSURE OF INVENTION

It is an object of the present invention to provide a loose wheel nut indicator that overcomes, or at least substantially ameliorates, the problems and shortcomings of the aforementioned prior art, or at least provides a useful alternative.

According to the present invention, there is provided an apparatus for visually indicating a loose wheel nut on a motor vehicle, comprising:
 (a) a first means for engaging a first wheel nut so as to be rotatable therewith and having a first pointer for indicating a start position of the first engaging means,
 (b) a second means for engaging a second wheel nut adjacent to the first wheel nut so as to be rotatable therewith, and having a second pointer for indicating a start position of the second engaging means, and
 (c) an elongate member which is resiliently flexible and which interconnects the first and second engaging means, the elongate member being configured to curve in at least two directions and having a first end portion and an opposed second end portion, wherein the first end portion is connected to the first engaging means and the second end portion is connected to the second engaging means, such that, in use, any loosening rotation of the first wheel nut will cause the first engaging means and its pointer to rotate therewith, thereby providing a visual indication of a loosening of the first wheel nut.

Preferably, the elongate member is configured such that any straightening of the elongate member caused by loosening of the first wheel nut will cause the elongate member to apply a compressive tension on the second engaging means, thereby countering any loosening rotation of the second wheel nut to prevent any loosening thereof.

Preferably, the elongate member is configured such that the compressive tension applied on the second engaging means will cause the elongate member to apply a compressive tension on the first engaging means, thereby countering any further loosening rotation of the first wheel nut to restrain any further loosening thereof.

It is preferred that each of the first and second engaging means is selected from the group consisting of rings, caps, loops and covers.

Each of the first and second engaging means may, in some preferred embodiments, be a ring having spaced apart transverse grooves formed on the inwardly facing surface of the ring so as to grip the wheel nut around its angled corners.

Alternatively, each of the first and second engaging means may be a cap having spaced apart transverse grooves formed on the inwardly facing surface of the cap so as to grip the wheel nut around its angled corners.

In a preferred form, the elongate member is configured to include the general shape of an inverted S.

Preferably, each of the first and second pointers comprises an arrowhead formed integrally with the respective engaging means.

According to another aspect of the present invention, there is provided a method for visually indicating a loose wheel nut on a motor vehicle, including the steps of:

(a) providing a first apparatus and a second apparatus according to the present invention, (b) engaging the first apparatus and the second apparatus with respective adjacent first and second pairs of first and second wheel nuts, wherein the start position of each of the first and second engaging means indicated by the respective pointer is such that a first pointer of a first engaging means of the first apparatus points in a direction that is aligned with a direction of pointing of a second pointer of a second engaging means of the second apparatus, and (c) visually monitoring any rotation of the pointer of the first engaging means and/or the pointer of the second engaging means of each of the first and second apparatus to indicate a loosening of the respective wheel nut.

BRIEF DESCRIPTION OF THE DRAWINGS

In order that the invention may be more readily understood and put into practical effect, reference will now be made to the accompanying drawings, in which:

FIG. 1 is a plan view of a loose wheel nut indicating apparatus according to a preferred embodiment of the present invention, FIG. 2 is a perspective view of the apparatus of FIG. 1, FIG. 3 is a plan view of a loose wheel nut indicating apparatus according to another preferred embodiment of the present invention, FIG. 4 is a side view of the apparatus of FIG. 3, FIG. 13 is a top view of the apparatus of FIG. 5 when engaged with a first pair of first and second wheel nuts, FIG. 14 is a cross-sectional view through A-A of FIG. 13, FIG. 15 is a side view of the apparatus when engaged with the nuts as shown in FIG. 13, FIG. 16 is a perspective view of the apparatus when engaged with the nuts as shown in FIG. 13.

MODES FOR CARRYING OUT THE INVENTION

Figure 6:
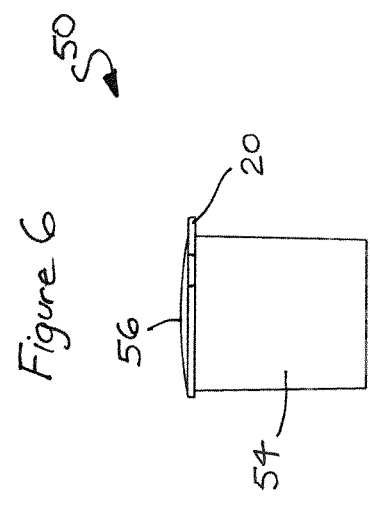
FIG. 6 is an end view of the apparatus of FIG. 5.
Figure 8:
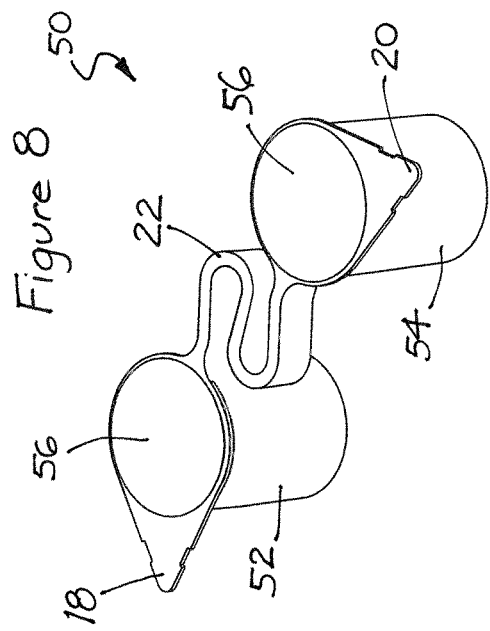
FIG. 8 is a perspective view of the apparatus of FIG. 5.
Figure 5:
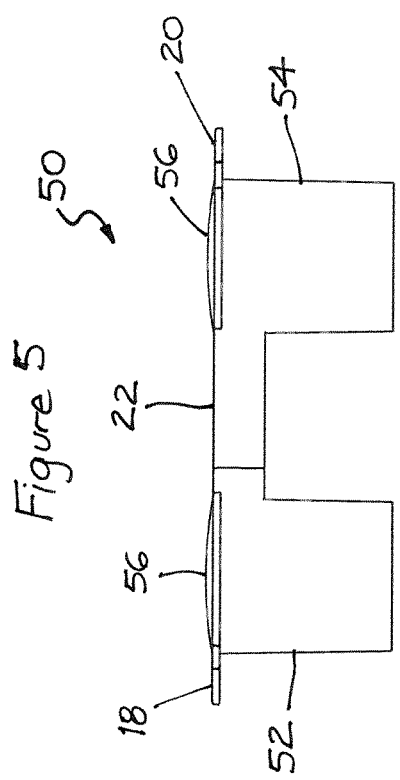
FIG. 5 is a side view of a loose wheel nut indicating apparatus according to yet another preferred embodiment of the present invention.
Figure 7:
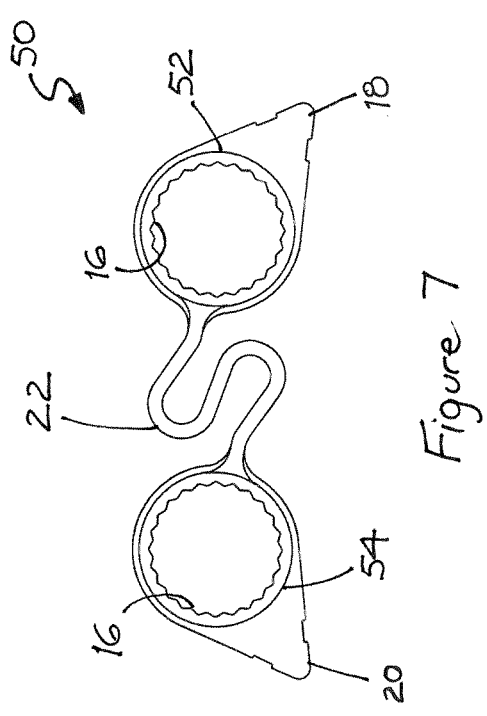
FIG. 7 is a bottom view of the apparatus of FIG. 5.
Figure 10:
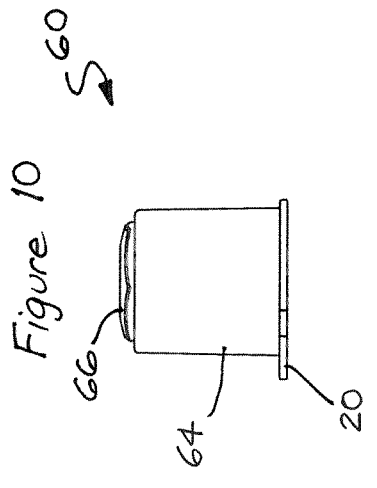
FIG. 10 is an end view of the apparatus of FIG. 9.
Figure 9:
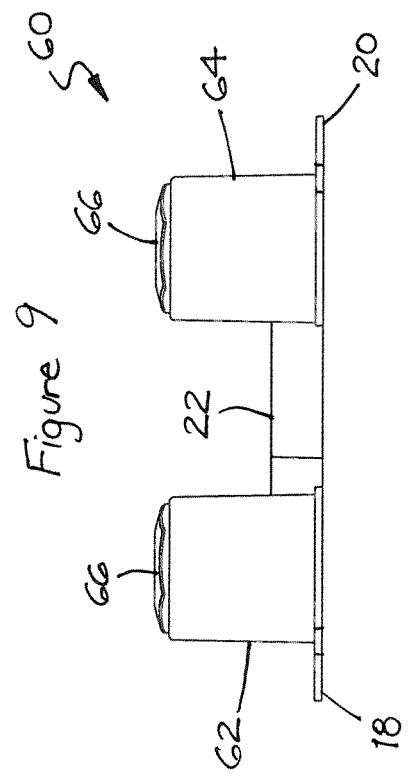
FIG. 9 is a side view of a loose wheel nut indicating apparatus according to still another preferred embodiment of the present invention.
Figure 11:
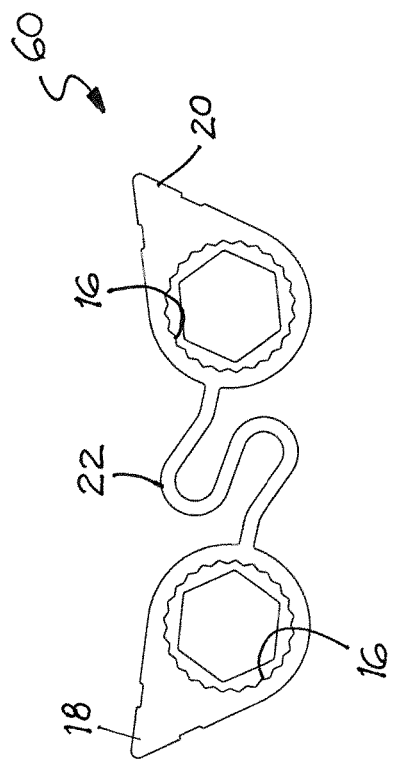
FIG. 11 is a bottom view of the apparatus of FIG. 9.
Figure 12:
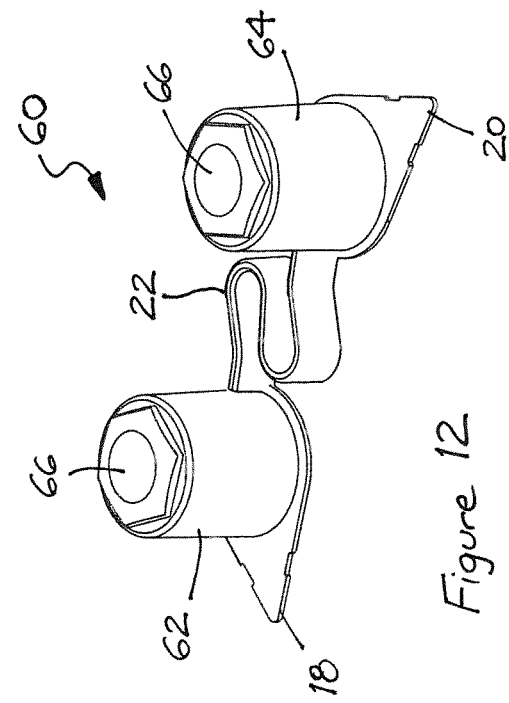
FIG. 12 is a perspective view of the apparatus of FIG. 9.

The apparatus 10 shown in FIGS. 1 and 2 is to be used primarily for visually indicating a loose wheel nut on a road motor vehicle, but may also be used to prevent any loosening of an adjacent wheel nut which, in turn, may restrain any further loosening of the loose wheel nut.

The apparatus 10 has a pair of rings 12, 14 for engaging around respective first and second wheel nuts which are adjacent to each other and arranged as a part of a conventional, equally spaced, circular arrangement of wheel nuts around the hub flange of a disc wheel. Alternatively, the apparatus 10 may have a pair of caps, loops, covers or other suitable means for engaging a pair of adjacent wheel nuts.

The rings 12, 14 are rotatable with their respective wheel nut by having spaced apart transverse grooves 16 formed on their inwardly facing surface so as to grip the wheel nut around its angled corners. Such common rotation may alternatively be due to some other form of profile or shape on one or more inwardly facing surface of the wheel nut engaging means which creates the necessary grip, or due to the tightness with which the wheel nut engaging means grips the nut.

The rings 12, 14 have a respective pointer 18, 20 which indicates a start position of each ring. Each pointer 18, 20 is, in this embodiment, in the shape of an arrowhead and is formed integrally with its ring. Alternatively, the pointer may be in the form of a barb or be otherwise wedge shaped, or may comprise some other form of visual indicator of a start position, such as a printed, grooved or embossed line.

The apparatus 10 also has an elongate member 22 which is made of a resiliently flexible material, such as polypropylene or a low density polyethylene (LDPE) or other suitable polymer material, and which interconnects the rings 12, 14.

In this embodiment, the elongate member 22 is formed integrally with the rings 12, 14, which are thus made of the same polymer material as the elongate member, such as by a plastic injection moulding process. Alternatively, the rings 12, 14 may be made of a different material to the elongate member 22 and the separate components connected together under suitable heat and pressure conditions or by other suitable connecting means.

The elongate member 22 is configured to curve in at least two directions. In this embodiment, where the nut tightening direction is clockwise, this curved configuration of the elongate member 22 includes the general shape of an inverted S (similar to a reflected S) when the apparatus 10 is viewed in use (which view is from the positions used to show the apparatus in FIGS. 1 and 2). As best shown in FIG. 1, a central portion 24 of the elongate member 22 defines the general shape of an inverted S which is the predominant shape in the configuration of the elongate member 22. As such, the central portion 24 curves in two directions with a single point or region of inflection 26 therebetween. There are shorter first and second curved end portions 28, 30 of the elongate member 22 extending from respective opposite ends of the central portion 24 at which there are points or regions of inflection 32, 34. The curved end portions 28, 30 are connected to the respective rings 12, 14. Each change in the direction of curvature in the configuration of the elongate member 22 is identified by the points or regions of inflection 26, 32, 34.

In this embodiment, each of the first and second curved end portions 28, 30 is connected to its respective ring 12, 14 at a point and in a direction that is generally perpendicular to a line that is tangential to the point, although other suitable points and directions at which the curved end portions 28, 30 are connected to the rings 12, 14 are within the ambit of the invention, such as tangential directions.

In use, an apparatus 10 is engaged to each adjacent pair of wheel nuts on a disc wheel of a road motor vehicle.

The start position, in this instance of use, of each of the rings 12, 14 indicated by the respective pointer 18, 20 is such that the pointer 18 of the ring 12 of one apparatus points in a direction that is aligned with a direction of pointing of the pointer 20 of the ring 14 of an adjacent apparatus 10.

Any loosening rotation of the first wheel nut will cause the ring 12 and its pointer 18 to rotate therewith, thereby providing a visual indication of a loosening of the first wheel nut. This will also cause the elongate member 22 to become straighter, and so provide a possible further visual indication of the loose first wheel nut.

This result will also arise in the course of use of the apparatus of the invention having any of the above described configurations of the elongate member interconnecting the first and second wheel nut engaging means.

Furthermore, the configuration of the elongate member 22 is such that any straightening of the elongate member 22 caused by loosening of the first wheel nut will cause the elongate member 22 to apply a compressive tension on the ring 14, thereby countering any loosening rotation of the second wheel nut to prevent any loosening thereof.

Moreover, the configuration of the elongate member 22 is such that the compressive tension applied on the ring 14 will cause the elongate member 22 to apply a compressive tension on the ring 12, thereby countering any further loosening rotation of the first wheel nut to restrain any further loosening thereof.

The apparatus 40 shown in FIGS. 3 and 4 has the same use or purpose as the apparatus 10, and is similar in structure and function to the apparatus 10, and so like features are identified, and are to be understood, by reference to like numerals.

The apparatus 40 only differs structurally from the apparatus 10 by having a pair of cut-outs 42, 44 formed on opposite sides of each pointer 18, 20, and by having a plurality of raised lines 46 or ribs formed on the upper surface of an upwardly projecting annulus portion 48 immediately surrounding the grooves 16 of each ring 12, 14. In this embodiment, there are twelve raised lines 46 which are equidistant and radially spaced apart from each other, but the number of such lines may vary.

The apparatus 50 and 60, shown in FIGS. 5 to 8 and FIGS. 9 to 12, respectively, have the same use or purpose as the apparatus 10 and 40, and have some features which are like, or similar in structure and function to, features of the apparatus 10 and 40. Like features are identified, and are to be understood, by reference to like numerals.

The apparatus 50, shown in FIGS. 5 to 8 in isolation and shown in FIGS. 13 to 16 when engaged with a first pair of first and second wheel nuts, differs structurally from the apparatus 10 and 40 by having a pair of caps 52, 54 for engaging around, and over the top of, respective first and second wheel nuts which are adjacent to each other. The top 56 of each cap 52, 54 is slightly dome shaped.

The caps 52, 54 of apparatus 50, like the rings 12, 14 of apparatus 10 and 40, are rotatable with their respective wheel nut by having spaced apart transverse grooves 16 formed on their inwardly facing surface so as to grip the wheel nut around its angled corners.

The caps 52, 54 have a respective pointer 18, 20 at the upper ends thereof which indicates a start position of each cap. Each pointer 18, 20 is formed integrally with its cap 56.

The apparatus 50 also has an elongate member 22 which is made of a resiliently flexible material and which integrally interconnects the caps 52, 54 at the upper ends thereof. The elongate member 22 of apparatus 50 is configured to curve in a similar way to that of apparatus 10 and 40, and is connected at its opposed ends to the respective caps 52, 54 in a similar way to that of apparatus 10 and 40.

FIGS. 13 to 16 show the apparatus 50 engaged in the manner described above with a first pair of first and second wheel nuts 57, 58 which may be threadably engaged to corresponding studs arranged through a disc wheel of a road motor vehicle or the like.

The apparatus 60 shown in FIGS. 9 to 12 differs structurally from the apparatus 10 and 40, and is similar to the apparatus 50, by having a pair of caps 62, 64. However, unlike the pair of caps 52, 54 of apparatus 50, the caps 62, 64 of apparatus 60 have a respective top 66 which is shaped to resemble the top of a nut.

The caps 62, 64 of apparatus 60, like the rings 12, 14 of apparatus 10 and 40 and like the caps 52, 54 of apparatus 50, are rotatable with their respective wheel nut by having spaced apart transverse grooves 16 formed on their inwardly facing surface so as to grip the wheel nut around its angled corners.

The caps 62, 64 have a respective pointer 18, 20 at the lower ends thereof which indicates a start position of each cap. Each pointer 18, 20 is formed integrally with its cap.

The apparatus 60 also has an elongate member 22 which is made of a resiliently flexible material and which integrally interconnects the caps 62, 64 at the lower ends thereof. The elongate member 22 of apparatus 60 is configured to curve in a similar way to that of apparatus 10, 40 and 50, and is connected at its opposed ends to the respective caps 62, 64 in a similar way to that of apparatus 10, 40 and 50.

The use of each apparatus 40, 50 and 60 can be readily understood by reference to the earlier description of the use of the apparatus 10 above and by substituting reference in that description to the rings 12, 14 of apparatus 10 with reference instead to the rings or caps of each apparatus 40, 50 and 60.

Figure 17:
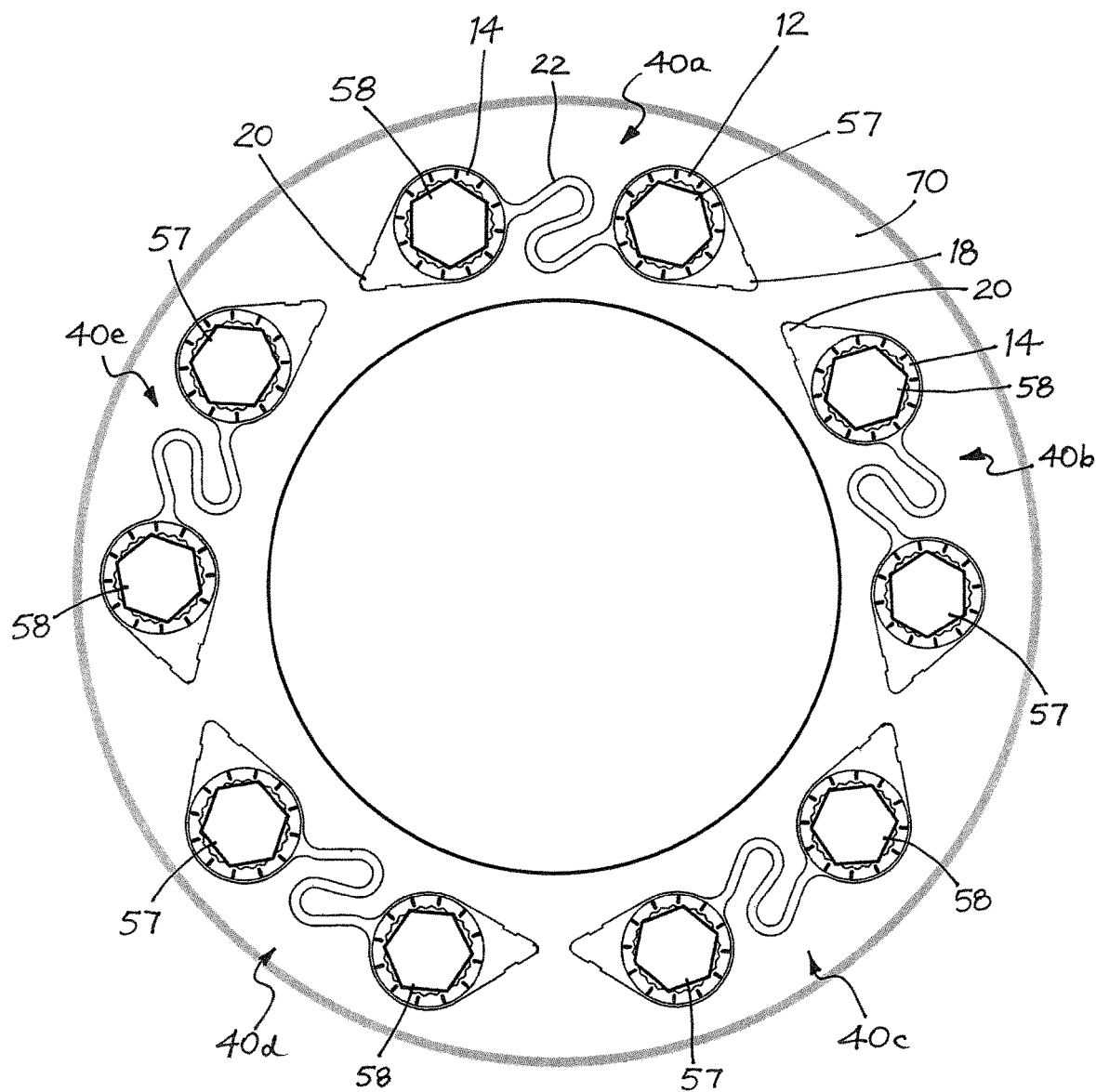
FIG. 17 is a side view of a wheel shown fitted with a number of loose wheel nut indicating apparatus of FIG. 3, and showing the pointers of each apparatus in a start position at the time of fitting.
Figure 18:
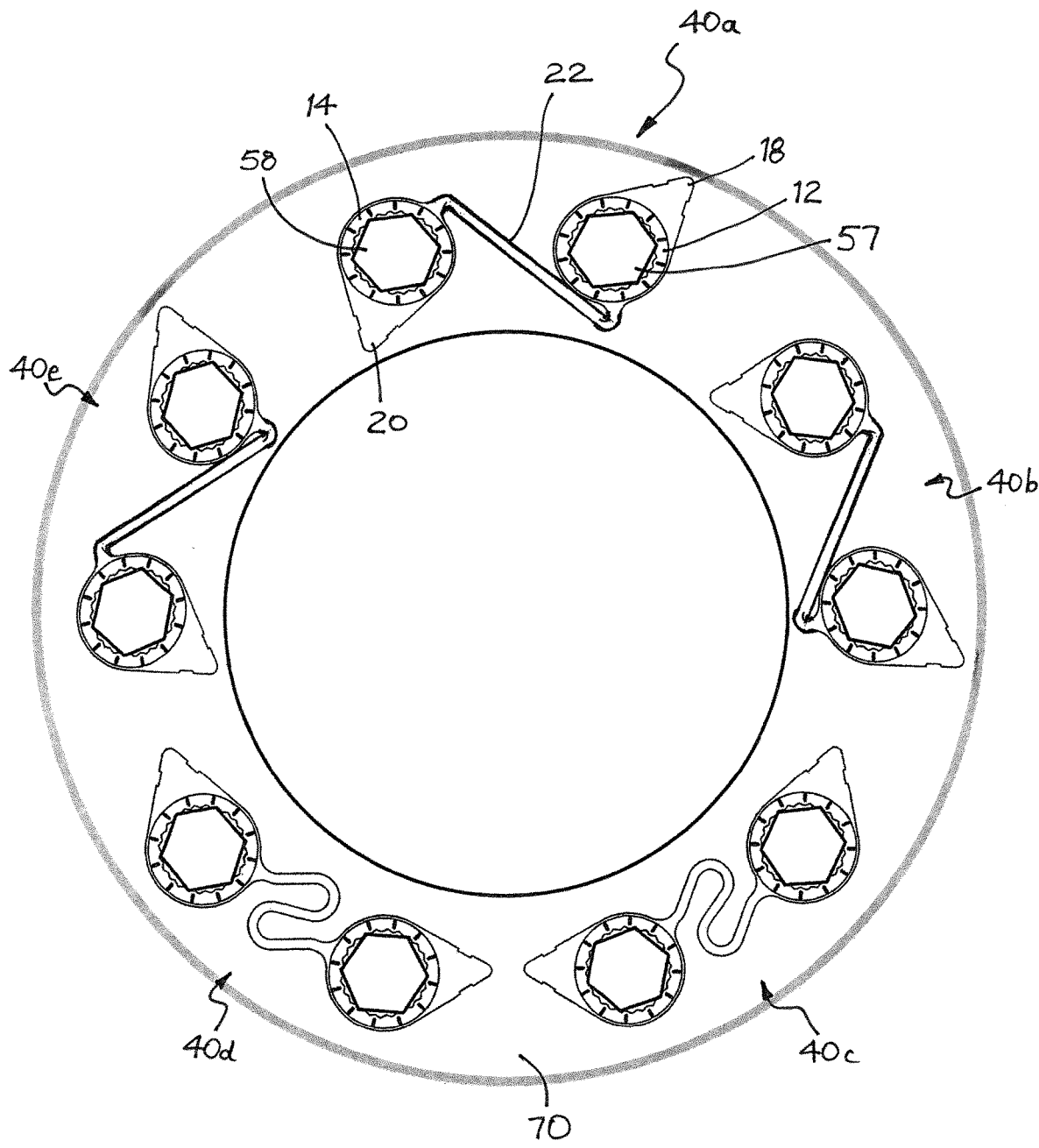
FIG. 18 is a side view of the wheel fitted with the apparatus as shown in FIG. 17, and showing the pointers of some of the apparatus in a rotated position indicating a loosening of the wheel nuts to which those apparatus are engaged.

By way of specific example, FIGS. 17 and 18 show the use of apparatus 40 shown in FIGS. 3 and 4 engaged to each adjacent pair of wheel nuts 57, 58 on a disc wheel 70 of a road motor vehicle. For ease of reference, each of the above apparatus 40 shown in FIGS. 17 and 18 is identified separately as apparatus 40a to 40e.

FIG. 17 shows the start position of each apparatus 40a to 40e. In this instance of use, the pair of rings 12, 14 of each apparatus 40a to 40e has a start position indicated by the respective pointers 18, 20. The pointer 18 of the ring 12 of any one of the apparatus 40a to 40e points in a direction that is aligned with a direction of pointing of the pointer 20 of the ring 14 of an adjacent one of the apparatus 40a to 40e.

FIG. 18 shows that, with use, there has been a loosening rotation of the wheel nuts 57, 58 to which apparatus 40a, 40b and 40e are each engaged. For example, the loosening rotation of the wheel nuts 57, 58 to which apparatus 40a is engaged has caused the rings 12, 14 and their respective pointers 18, 20 of that apparatus 40a to rotate therewith, thereby providing a visual indication of a loosening of those nuts 57, 58. This has also caused the elongate member 22 of apparatus 40a to become straighter, and so provide a further visual indication of the loose wheel nuts 57, 58.

The straightening of the elongate member 22 has also applied a compressive tension on the ring 14, thereby countering any loosening rotation of the wheel nut 58 to prevent any further loosening thereof.

The compressive tension applied on the ring 14 has also caused the elongate member 22 to apply a compressive tension on the ring 12, thereby countering any further loosening rotation of the wheel nut 57 to restrain any further loosening thereof.

It will also be readily apparent to persons skilled in the art that various modifications may be made in details of design and construction of the loose wheel nut indicators described above without departing from the scope or ambit of the invention.

The invention claimed is:

1. A method for visually indicating a loose wheel nut on a motor vehicle wheel which has a plurality of four consecutive installed wheel nuts designated $1^{st}$, $2^{nd}$, $3^{rd}$, and $4^{th}$ wheel nuts, comprising the steps of:
   (a) providing first and second apparatus, each apparatus having (i) first and second engaging means configured to at least partially engage one of said wheel nuts so as to be rotatable therewith, each engaging means having a pointer extending radially for indicating a start position, and (ii) an elongate member which has first and second end portions respectively connected to said first and second engaging means, the elongate member being configured to curve in at least two directions,
   (b) mounting said engaging means of the first apparatus on said $1^{st}$ and $2^{nd}$ wheel nuts,
   (c) mounting said engaging means of the second apparatus on said $3^{rd}$ and $4^{th}$ wheel nuts,
   (d) positioning each of said engaging means of the first and second apparatus wherein the start position of each of the first and second engaging means indicated by the respective pointer is such that a first pointer of a first engaging means of the first apparatus points in a direction that is aligned with a direction of pointing of a second pointer of a second engaging means of the second apparatus, and
   (e) visually monitoring any rotation of the pointer of the first engaging means and/or the pointer of the second engaging means of each of the first apparatus and/or the second apparatus to indicate a loosening of the respective wheel nut,
       wherein said elongate member is resiliently flexible such that any rotation of one of the first and second engaging means with respect to the start position caused by a loosening rotation of a respective one of the wheel nuts on which the one of the first and second engaging means is engaged, causes the elongate member to apply a compressive tension on the other one of the first and second engaging means.

2. A method for visually indicating a loose wheel nut on a motor vehicle wheel which has a plurality of four consecutive wheel nuts designated $1^{st}$, $2^{nd}$, $3^{rd}$ and $4^{th}$, comprising the steps of:
   (a) providing a first and second apparatus, each apparatus having (i) a first ring element configured to at least partially surround and engage a first of said installed wheel nuts so as to be rotatable with said first engaged wheel nut and having a first pointer extending outwardly for indicating a start position of the first ring element, (ii) a second ring element configured to at least partially surround and engage a second of said installed wheel nuts that is adjacent to the first wheel nut so as to be rotatable with said second engaged wheel nut and having a second pointer extending outwardly for indicating a start position of the second ring element and (iii) an elongate member which has first and second end portions that are respectively connected to said first and second ring elements, the elongate member being configured to curve in at least two directions, and
   (b) engaging said first and second ring elements of said first apparatus onto said $1^{st}$ and $2^{nd}$ wheel nuts, and engaging said first and second ring elements of said second apparatus onto said $3^{rd}$ and $4^{th}$ wheel nuts, wherein said ring element on said $2^{nd}$ wheel nut is adjacent said ring element on said $3^{rd}$ wheel nut, and said pointers of said adjacent ring elements are aligned toward each other as a start position, and
   (c) visually monitoring said pointers for any rotation of either or both of said pointers of the ring elements on said adjacent $2^{nd}$ and $3^{rd}$ wheel nuts to indicate a rotation and thus loosening of either of the respective wheel nuts,
       wherein said elongate member is resiliently flexible such that any rotation of one of the first and second ring element with respect to the start position caused by a loosening rotation of a respective one of the wheel nuts on which the one of the first and second ring element is engaged, causes the elongate member to apply a compressive tension on the other one of the first and second ring element.

3. The method according to claim 1 where said elongate member is configured to include the general shape of an inverted S, and where loosening and rotation of a wheel nut causes rotation of the engaging means mounted on said wheel nut, causing at least partial straightening of said S-shaped elongate member whose second end then applies a tightening rotational torque on the other of said pair of wheel nuts engaged by said apparatus.

4. The method according to claim 2, where loosening of one of said pair of wheel nuts causes a tightening force to be applied to the other of said pair of wheel nuts.

5. A method for visually indicating a loose wheel nut on a motor vehicle wheel which has a plurality of four consecutive wheel nuts designated $1^{st}$, $2^{nd}$, $3^{rd}$ and $4^{th}$ wheel nuts, comprising the steps of:
   a. securely gripping said $1^{st}$ and $2^{nd}$ wheel nuts, respectively, with $1^{st}$ and $2^{nd}$ ring elements which include between and connecting them a strip, each ring element including a pointer extending therefrom;
   b. securely gripping said $3^{rd}$ and $4^{th}$ wheel nuts, respectively, with $3^{rd}$ and $4^{th}$ ring elements which include between and connecting them a strip, each ring element including a pointer extending therefrom;
   c. when gripping said wheel nuts in a start position, orienting said pointers of said $2^{nd}$ and $3^{rd}$ ring elements to be in alignment with each other; and
   d. thereafter visually monitoring any rotation of the pointers of the $2^{nd}$ and/or $3^{rd}$ ring elements, which would indicate a loosening of the respective wheel nut gripped by a ring element from which said rotated pointer extends,
      wherein said strip is resiliently flexible such that any rotation of one of the first and second ring element with respect to the start position caused by a loosening rotation of a respective one of the wheel nuts on which the one of the first and second ring element is engaged, causes the elongate member to apply a compressive tension on the other one of the first and second ring element.

* * * * *